(12) United States Patent
McMaster et al.

(10) Patent No.: US 8,843,959 B2
(45) Date of Patent: Sep. 23, 2014

(54) GENERATING SYNCHRONIZED INTERACTIVE LINK MAPS LINKING TRACKED VIDEO OBJECTS TO OTHER MULTIMEDIA CONTENT IN REAL-TIME

(76) Inventors: Orlando McMaster, Tampa, FL (US); Eustace P. Isidore, Austin, TX (US)

( * ) Notice: Subject to any disclaimer, the term of this patent is extended or adjusted under 35 U.S.C. 154(b) by 746 days.

(21) Appl. No.: 12/234,585

(22) Filed: Sep. 19, 2008

(65) Prior Publication Data

US 2009/0083815 A1 Mar. 26, 2009

Related U.S. Application Data

(60) Provisional application No. 60/973,636, filed on Sep. 19, 2007.

(51) Int. Cl.
| | |
|---|---|
| *H04N 5/445* | (2011.01) |
| *H04N 7/173* | (2011.01) |
| *H04N 21/4725* | (2011.01) |
| *H04N 21/478* | (2011.01) |
| *H04N 21/858* | (2011.01) |

(52) U.S. Cl.
CPC ....... *H04N 7/17318* (2013.01); *H04N 21/4725* (2013.01); *H04N 21/47815* (2013.01); *H04N 21/8586* (2013.01)
USPC ................... 725/40; 725/39; 725/41; 725/42; 725/43; 725/51; 725/112; 725/113; 715/862; 715/802; 715/856; 715/857; 715/858; 382/103; 382/106; 382/286; 382/291

(58) Field of Classification Search
USPC ........ 725/39–43, 51, 112–113; 715/465, 802, 715/856–860, 862; 382/103, 106, 286, 291
See application file for complete search history.

(56) References Cited

U.S. PATENT DOCUMENTS

| | | | |
|---|---|---|---|
| 5,929,849 A * | 7/1999 | Kikinis | 725/113 |
| 6,282,713 B1 * | 8/2001 | Kitsukawa et al. | 725/36 |
| 6,538,672 B1 * | 3/2003 | Dobbelaar | 715/810 |
| 7,325,245 B1 * | 1/2008 | Clapper | 725/54 |
| 7,367,042 B1 * | 4/2008 | Dakss et al. | 725/60 |
| 2004/0031062 A1 * | 2/2004 | Lemmons | 725/136 |
| 2009/0006958 A1 * | 1/2009 | Pohjola et al. | 715/710 |

* cited by examiner

*Primary Examiner* — Nicholas Corbo
(74) *Attorney, Agent, or Firm* — Yudell Isidore PLLC

(57) ABSTRACT

The method, system and computer program product generate online interactive maps linking tracked objects (in a live or pre-recorded video sequence) to multimedia content in real time. Specifically, an object tracking and link generation (OTLG) utility allows a user to access multimedia content by clicking on moving (or still) objects within the frames of a video (or image) sequence. The OTLG utility identifies and stores a clear image(s) of an object or of multiple objects to be tracked and initiates a mechanism to track the identified objects over a sequence of video or image frames. The OTLG utility utilizes the results of the tracking mechanism to generate, for each video frame, an interactive map frame with interactive links placed in the map frame at a location corresponding to the object's tracked location in each video frame.

19 Claims, 12 Drawing Sheets

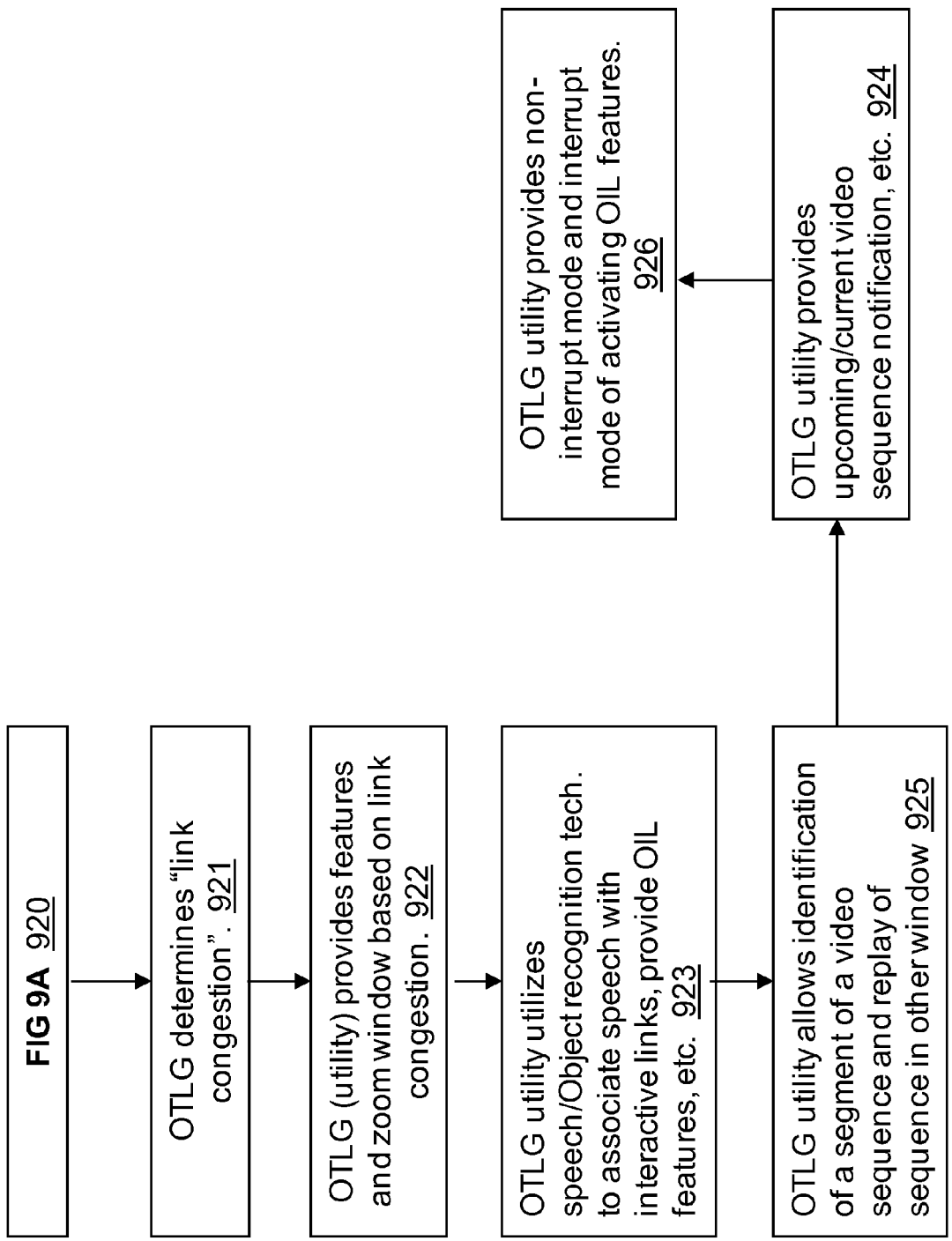

GENERATING SYNCHRONIZED INTERACTIVE LINK MAPS LINKING TRACKED VIDEO OBJECTS TO OTHER MULTIMEDIA CONTENT IN REAL-TIME

PRIORITY CLAIM

The present invention claims priority from U.S. Provisional Patent Application Ser. No. 60/973,636, filed on Sep. 19, 2007; the contents of which is incorporated herein by reference in its entirety.

BACKGROUND OF THE INVENTION

1. Technical Field

The present invention generally relates to multimedia devices and in particular to a mechanism for tracking content within presentations on multimedia devices. Still more particularly, the present invention relates to a method and system for providing real time (or online) tracking of objects, generating interactive links and accessing content associated with objects within presentations on multimedia devices.

2. Description of the Related Art

Technological advances in video processing have led to an increase in the production of digital interactive systems, such as interactive televisions, which provide consumers with greater control of the way in which consumers receive and view multimedia content. Most of this interactivity has been tied to gaming applications that run on television and providing menu options for selecting programs of interest or for controlling the receipt and handling of content of interest to the consumer (e.g., selecting, surfing to, recording, pausing and/or rewinding displayed content).

Along with this increase in the production of multimedia interactive systems has been an increase in the use of the Internet to present multimedia content. Televisions screens are now becoming ubiquitous with a computer monitor and a large number of modern design televisions and monitors may be utilized interchangeable to perform either function. Tied to this increase in presentation of multimedia content over the Internet is a parallel increase in internet advertising. The amount of money spent on internet advertising is currently only be limited by the availability of talent (i.e., persons with the requisite knowledge, skill set and/or abilities) to produce internet-worthy graphics and animation in an increasingly competitive environment.

Dynamic forms of advertising, including internet-based video advertising, are of particular focus. The growth of online communities which focus on user-created/submitted video content underscores the consumers' interest in video content, in particular. However, video advertising on the internet is still in the earlier stages of development. There is thus a need for more innovative and effective methods for advertising on the internet. This need also applies to the conventional television arena, where conventional advertisements are still treated as separate content from the content being watched by the consumer, and which interrupts the broadcast of consumer content in order to provide information about the advertised product.

SUMMARY OF THE INVENTION

Disclosed are a method, system and computer program product for generating online interactive maps linking tracked objects (in a live or pre-recorded video sequence) to multimedia content in real time. Specifically, an object tracking and link generation (OTLG) utility allows a user to access multimedia content by clicking on "moving" (or still) objects within the frames of a video (or image) sequence. (The object may change position from frame to frame. Thus, this changing of position is referred to as moving). The OTLG utility identifies and stores a clear image(s) of an object or of multiple objects to be tracked and initiates a mechanism to track the identified objects over a sequence of video or image frames. The OTLG utility utilizes the results of the tracking mechanism to generate, for each video frame, an interactive map frame with interactive links placed in the map frame at a location corresponding to the object's tracked location in each video frame.

Each video frame in the video sequence may be (optionally) overlaid with the (essentially transparent) interactive map frame, providing live dynamic links to other multimedia content in real time. In particular, the OTLG utility provides the mechanism for the delivery of entertainment, educational, promotional content, etc., in the form of more video, images, audio, and text. For example, the OTLG utility may be used as a marketing and advertising tool to facilitate product advertising and greater product awareness. The multimedia content may be stored on the same digital storage media (for pre-recorded content) which stores the image or video sequence or may be accessible via a network, such as the Internet. In order to provide easier mouse click access to moving interactive links or icons corresponding to moving objects, the multimedia links for a particular frame may remain accessible when the video is in pause or slow speed mode. The OTLG utility also provides a mouse click miss facility which allows a user to select the link (from a selection box of links) which the user intended to activate prior to the user's missing (via mouse click, for example) the interactive link target. Additionally, the OTLG utility may provide a list of dynamic links per (set of) frame(s) indicated by appropriate icons by which a user may access multimedia content. These dynamic links may be occasionally updated or changed to allow a user to access different sets of content, depending on the video frame being displayed at the time the object link is selected/activated. Thus, the OTLG utility allows the user to efficiently access related information and/or multimedia content in real time, by providing the user with interactive links from video objects.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
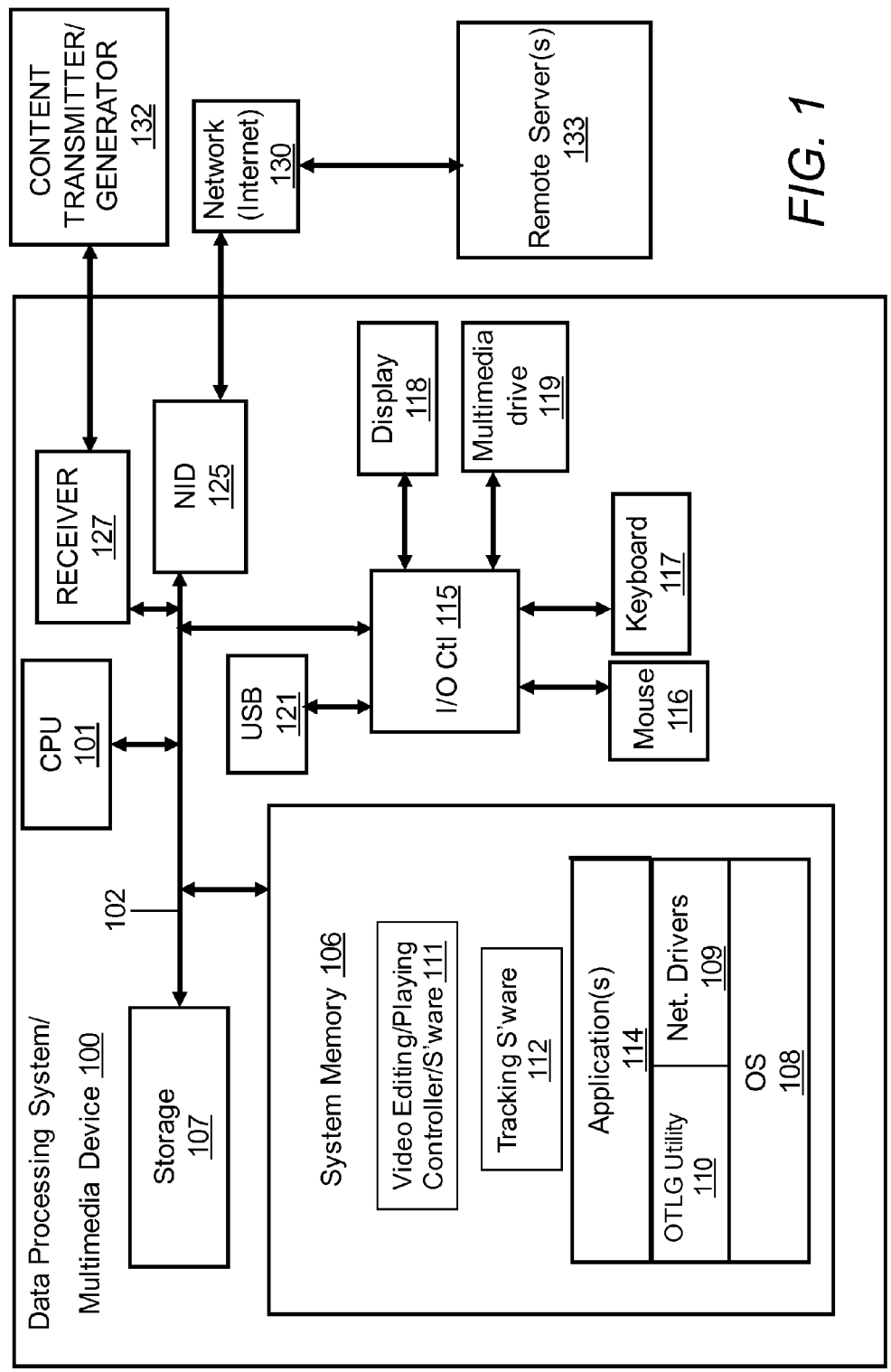
FIG. 1 is a network connected data processing system operating as an interactive multimedia device, according to an illustrative embodiment of the invention.

The present invention provides a method, system and computer program product for generating online interactive maps linking tracked objects (in a live or pre-recorded video sequence) to multimedia content in real time. Specifically, an object tracking and link generation (OTLG) utility allows a user to access multimedia content by clicking on moving (or still) objects within the frames of a video (or image) sequence. The OTLG utility identifies and stores a clear image(s) of an object or of multiple objects to be tracked and initiates a mechanism to track the identified objects over a sequence of video or image frames. The OTLG utility utilizes the results of the tracking mechanism to generate, for each video frame, an interactive map frame with interactive links placed in the map frame at a location corresponding to the object's tracked location in each video frame.

Each video frame in the video sequence may be (optionally) overlaid with the (essentially transparent) interactive map frame, providing live dynamic links to other multimedia content in real time. In particular, the OTLG utility provides the mechanism for the delivery of entertainment, educational, promotional content, etc., in the form of more video, images, audio, and text. For example, the OTLG utility may be used as a marketing and advertising tool to facilitate product advertising and greater product awareness. The multimedia content may be stored on the same digital storage media (for pre-recorded content) which stores the image or video sequence or may be accessible via a network, such as the Internet.

In order to provide easier mouse click access to moving interactive links or icons corresponding to moving objects, the multimedia links for a particular frame may remain accessible when the video is in pause or slow speed mode. The OTLG utility also provides a mouse click miss facility which allows a user to select the link (from a selection box of links) which the user intended to activate prior to the user's missing (via mouse click, for example) the interactive link target. Additionally, the OTLG utility may provide a list of dynamic links per (set of) frame(s) indicated by appropriate icons by which a user may access multimedia content. These dynamic links may be occasionally updated or changed to allow a user to access different sets of content, depending on the video frame being displayed at the time the object link is selected/activated.

The invention enables a convergence of content over the Internet (e.g., interactive links and other web content) with the content available on a traditional television set. Among these technological advances are the onset of video streaming online and the presence of web machines connected to standard televisions sets. The invention takes advantage of and further enhances developments in interactive television technology, including the ability to effectively advertise products and services using video content and internet broadcast capabilities signal. The invention thus provides a synergy of video content on the internet (or video content linked to content on the internet) and advertising.

Further, in the processing of video content, tracking of objects in video is of particular importance. The invention provides the mechanisms that enable the OTLG utility to decompose a video scene into the components of the scene to allow objects to be individually identified. This and other related features provide a unique and untapped potential for internet advertising via video linked to content on the internet (i.e., internet linked video content/components/objects) or for in-content advertising without requiring commercial interruption every n minutes. "Pay as you play" advertising features are also supported where an advertiser is made to only pay based on consumer interest in the advertiser's product (detected by clicking on the link within the GUI).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 2xx for FIG. 2 and 3xx for FIG. 3). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

With reference now to the figures, FIG. 1 depicts an example interactive multimedia device, provided as a data processing system within which features of the invention may be advantageously implemented. Multimedia device 100 comprises a central processing unit (CPU) 101 coupled to a memory 106 via a system bus/interconnect 102. Also coupled to system bus 102 is an input/output controller (I/O Controller) 115, which controls access by several input devices, of which a pointing device, such as mouse 116, and keyboard 117 are illustrated. I/O Controller 115 also controls access to output devices, of which display 118 is illustrated. As noted above, display may be one of a television screen or computer monitor, depending on the type of multimedia device 100 and/or the type of display device associated with multimedia device 100. Also, the technology utilized within display may be of any type, e.g., cathode ray tube (CRT), liquid crystal display LCD, and any other types known or developed for use with an electronic display. In order to support use of removable storage media, I/O Controller 115 may further support one or more USB ports, for example, USB 121, and multimedia drive 119 compact disk Read/Write (CDRW)/digital video disk (DVD) 119.

Multimedia device 100 further comprises network interface device (NID) 125 by which multimedia device 100 is able to connect to and communicate with an external device or network (such as the Internet). NID 125 may be a modem or network adapter and may also be a wireless transceiver device. Additionally, multimedia device 100 comprises receiver 127 by which multimedia device 100 receives communications/transmissions from a content transmitter/generator 132. For example, content transmitter/generator 132 may be a wired cable provider or a wireless (over-the-air or satellite connection) dish network provider. While illustrated as internal to the multimedia device 100, it is appreciated that in some implementations, receiver 127 may be external to the multimedia device 100 and connected to multimedia device 100 via a cable or wire or wireless connection (e.g., a cable television receiver box, an antenna amplifier, a dish receiver, and the like). The presentation herein of NID 125 and receiver 127 are intended solely to provide optional/alternative mechanisms for multimedia device 100 to receive multimedia content. However, in an alternate embodiment, such multimedia content may be received directly from an I/O device, such as a CD/DVD-ROM inserted into the appropriate Input device mechanism.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. When multimedia device 100 is a data processing system, multimedia device 100 may be, for example, an IBM eServer pSeries system, a product of International Business Machines Corporation in Armonk, N.Y., running the Advanced Interactive Executive (AIX) operating system or LINUX operating system.

Various features of the invention are provided as software code stored within memory 106 or other storage and executed by processor(s) 101. Among the software code are code for providing application server functionality, code for enabling network connection and communication via NID 125 and/or receiver 127 and more specific to the invention, code for enabling the Object Tracking and Link Generation (OTLG) features described below. For simplicity, the collective body of code that enables the OTLG features is referred to herein as OTLG utility. In actual implementation, the OTLG utility may be added to existing operating system (OS) code to provide the OTLG functionality described below.

Thus, as shown by FIG. 1, in addition to the above described hardware components, multimedia device 100 further comprises a number of software components, including operating system (OS) 108 (e.g., Microsoft Windows®, a trademark of Microsoft Corp, or GNU®/Linux®, registered trademarks of the Free Software Foundation and The Linux Mark Institute) and one or more software applications 114.

Multimedia device 100 also includes OTLG utility 110, which provides video editing controller 111, and tracking utility 112 as two of the functional software components. In implementation, OS 108 and OTLG utility 110 are located within memory 106 and executed on processor (CPU) 101. According to the illustrative embodiment, when processor 101 executes OTLG utility 110, OTLG utility 110 enables multimedia device 100 to complete a series of functional processes, including: (1) identifying video objects (including spoken "objects", visual objects, and textual objects) for tracking (of the video objects); (2) generating dynamic interactive links for the video objects; (3) initiating a tracking method and/or tracking of the identified video objects; (4) generating and placing of interactive links (upon representative symbols of objects) on a map frame (of identified objects and/or) based on the tracking results; (4) allowing a user to access multimedia content by activating (by mouse click, for example) the interactive links; and other features/functionality described below and illustrated by FIGS. 2-9.

Figure 2:
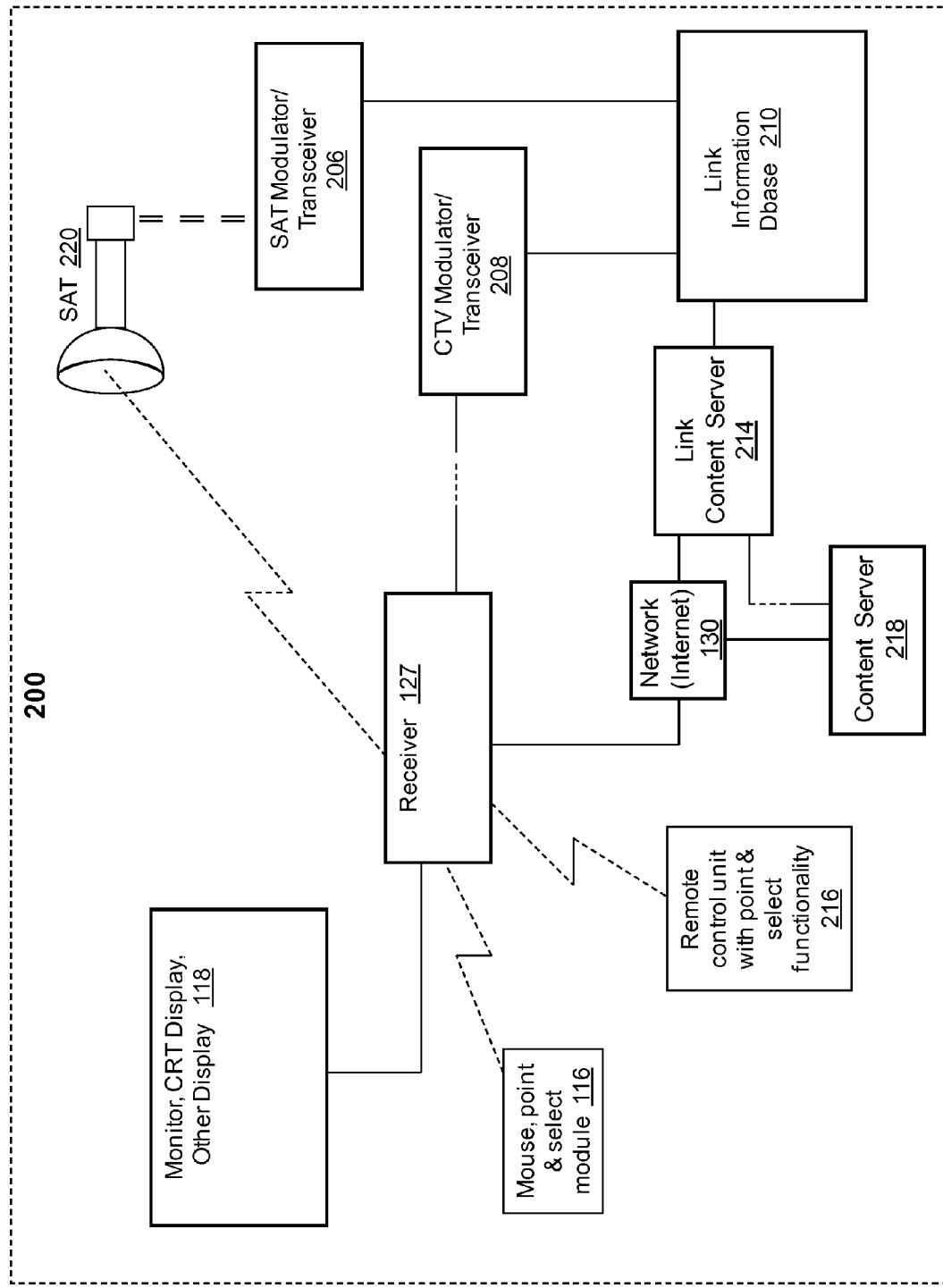
FIG. 2 is an illustration of a multimedia communication system within which an example interactive multimedia device, such as the device of FIG. 1 may be utilized, according to one embodiment of the invention.

Referring now to FIG. 2, there is depicted a block diagram representation of an example system environment within which the video-link interactive features of the invention may be implemented, according to one embodiment. FIG. 2 generally provides I/O components (i.e., monitor/display 118, mouse/pointing device 116, and remote control unit 216) of an example multimedia device 100 coupled via receiver 127 (internal or external) to multiple content providers via different connection means/mechanisms. Content providers may be numerous different types of providers. However, for simplicity, only three are provided for illustrative purposes. As shown, receiver 127 couples to a network 130, such as, but not limited to, the Internet, which provides connectivity to content server 218. Receiver 127 also couples, via wireless connection, to satellite transmitter 220, being controlled by a SAT modulator/transmitter 206, which provides content for transmission. Receiver 127 also couples to cable television system which includes CTV modulator/transceiver 208 for transmitting content to receiver 127.

Each content provider is shown connected to link content server 214 and/or link information database 210, which collectively provides content in which the links are embedded, according to one embodiment. This method for providing the links that are ultimately displayed on/over/with the content on monitor/display 118 represents only one such method for providing "linked content", which represents all content that includes the embedded or overlay of links and/or link images.

In one embodiment, link information database 210 may be a collection of code and/or location-based markers for identifying where specific links are to be displayed relative to content (e.g., content found at content server 218) that is being displayed concurrently. With this embodiment, one implementation enables the link information to only be provided to or retrieved by receiver 202 when the subscriber/user receiving the content has paid a fee to receive linked content with his regular content service. Alternatively, the linked content may be provided once the user of the multimedia device has bought "specialized" hardware. Thus, for example, the receiver 202 may be a specialized receiver, the monitor/display 118 may be a specialized monitor/display, the remote control may be a specialized remote control, et al., each designed with the technology to provide a display of linked content when received content is displayed on the monitor. With these implementations, the content will itself be provided with the link features associated therewith, whether embedded or separately downloaded and merged. The content generator and/or creator will thus create the content with specific links associated with linked components of the content, in a frame by frame or generalized manner, where required. Thus, link content server 218 may include both the content as well as the link information already embedded in the metadata or code or modulated signal for the content that will ultimately be displayed. The viewing/display of the links with the content is then turned on when an activation signal is detected/received on the multimedia device 100.

Figure 3:
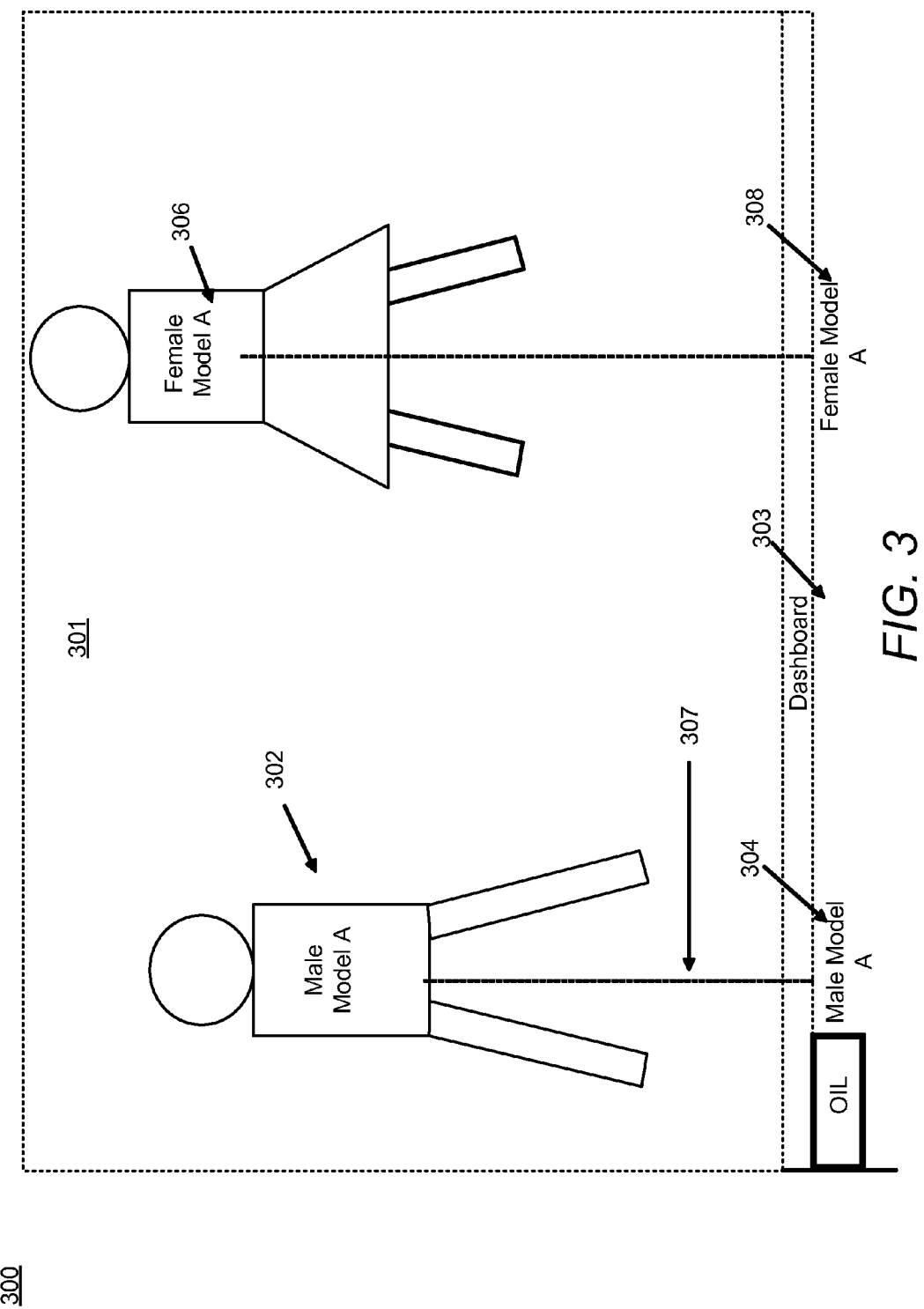
FIG. 3 illustrates (tracked) objects within a video frame and a dashboard that provides Object Interactive Link (OIL) features, according to an illustrative embodiment of the present invention.

FIG. 3 illustrates objects within a multimedia frame and a dashboard that provides Object Interactive Link (OIL) features, according to an illustrative embodiment of the present invention. Frame 300 comprises video display window 301 which further comprises first Male Model-A link 302 and first Female Model-A link 306. Frame 300 also comprises horizontally placed Dashboard 303 which further comprises interactive links second Male Model-A Link 304 and second Female Model-A Link 308. Also indicated in Frame 300 is vertical line 307 connecting first Male Model-A link 302 (within video window 301) to second Male Model-A link 304 (the corresponding link within the dashboard).

In Frame 300, OTLG utility 110 enables activation of Object Interactive Link (OIL) features during a running video sequence shown in video display window 301. In particular, OTLG utility 110 allows a user to access active interactive links (e.g., first Male Model-A link 302 and first Female Model-A link 306) and link content by a selection within window 301.

A container of interactive links at the screen border is hereinafter referred to as a "dashboard". The dashboard provides an alternate means of placing the interactive links within frame 300. As an alternative to accessing links within video window 301, OTLG utility 110 enables a user to access the same multimedia content by links second Male Model-A Link 304 and second Female Model-A Link 308 located in Dashboard 303. Dashboard 303 enables uncompromised/unobstructed viewing of a video sequence within window 301 while OIL activities occur.

The dashboard placement at the border allows access to the links without directly clicking on the video object. The dashboard also provides the user with another means for accessing the links when the user chooses to make the links on the link map invisible. With the single dashboard, one coordinate may be used for interactive link placement. Dashboard 303 is horizontally placed at the bottom of Frame 300. Alternatively, two dashboards may be used: one dashboard may (utilize a vertical coordinate of a tracked object and) indicate a vertical position of an object and may be placed vertically, along the side of the display screen; and the second dashboard may indicate a horizontal position and may be placed horizontally, along the bottom of the display screen. OTLG utility 110 may be configured to enable the interactive link associated with an object to be highlighted/indicated on the map during mouse rollover in a space surrounding the intersection of the horizontal and vertical coordinates of the central location of the tracked/displayed object. As an alternative, OTLG utility 110 allow all links to be visible while OIL features are active/enabled. In addition, OTLG utility 110 may be configured to allow the links to be accessed only at a dashboard.

In the dashboard (section of the display, a link for an object may be represented by text or an icon. The link may be highlighted and coded specifically to indicate the type of content that is being linked. For example, the content may be (more) video, text (webpage), audio/speech, images/photos, another interactive link, etc. An interactive multi-link (in the dashboard and/or the map of links) may be utilized to provide a link to a number of other link options.

Dashboard placement may be at bottom (or side) of display screen. Thus, dashboard may be placed beyond viewing portion of screen. In general, dashboard is placed at the bottom (default location) or top (alternate location with the same horizontal coordinates) of the viewing area.

Alternatively, dashboard may be used with invisible map but map links still remain functional (and may optionally appear with a mouse rollover). The presence of the live (yet invisible) interactive links may be inferred by the dashboard presence of an icon matching/corresponding to an object on screen.

In one embodiment, the dashboard may be utilized in a pseudo-tracking mode. In the pseudo tracking mode, the dashboard provides links that are associated with the objects in the video sequence but without directly tracking the objects. The dashboard still contains the links which are related to the objects in the video sequence. However, the dashboard being viewed with the current frame may contain links that are related to (i.e., associated with) objects that do not directly appear in the current frame and which objects have appeared (in earlier frames) or subsequently appears within a frame of the video sequence. In this pseudo-tracking mode, OTLG utility 110 may utilize tracking of some objects for synchronized link placement within the dashboard and also pseudo-tracking of other objects for link inclusion in the dashboard. In the pseudo-tracking mode, when tracking and pseudo-tracking methods are both used, two separate rows (or columns) of links within Dashboard 303 may be used for link placement and containment.

OTLG utility 110 may also resize the frame of the video sequence to allow the dashboard to be placed at a border location on the display which prevents any portion of the dashboard from covering any part of the video frame. The video frames may be resized by scaling the horizontal dimension and the vertical dimension of the frames by an equivalent amount. Alternatively, OTLG utility 110 may allow a user to scale both dimensions unequally.

In one embodiment, an additional window (or a dashboard) of links may be provided to content which have no direct link to objects. These links in the second window of links have no direct association with object tracking and may, for example, be used for some forms of advertising.

Figure 4:
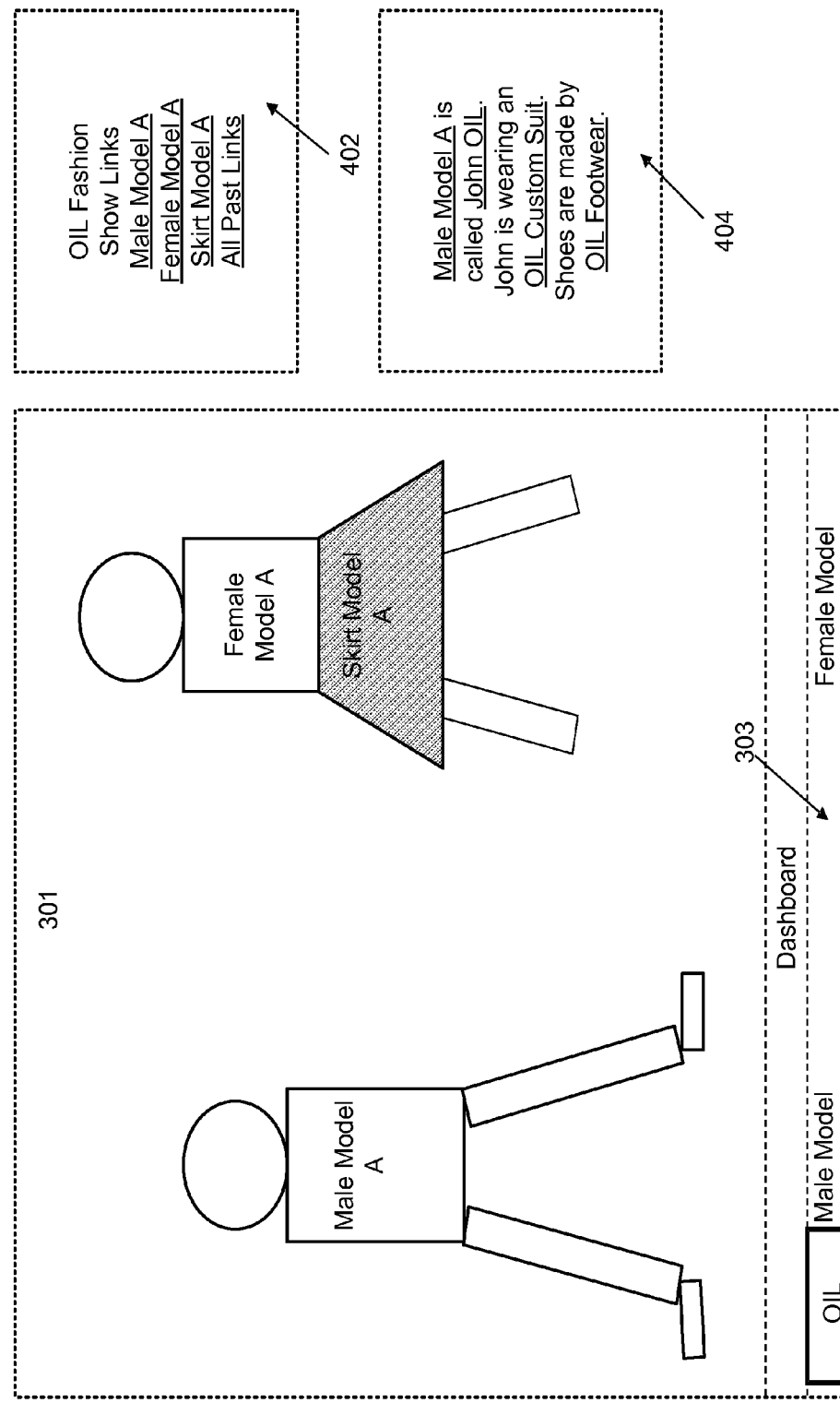
FIG. 4 is an illustration of an example output within the video frame of FIG. 2, including the objects highlighted with interactive links and a number of display windows within which the OIL features associated with the objects are provided, according to an illustrative embodiment of the present invention.

FIG. 4 is an illustration of an example output within the video frame of FIG. 2, including the objects highlighted with interactive links and a number of display windows within which the OIL features associated with the objects are provided, according to an illustrative embodiment of the present invention. Frame 400 comprises video window 301, Dashboard 303, links (list) window 402 and links information window 404.

Frame 400 provides links (list) window 402 as another way to access multimedia content. OTLG utility 110 accumulates links that appear within the video sequence and enables a user to conveniently access interactive links which may at one time or another appear in window 301 and/or dashboard 303. Information window 404 may be utilized to provide text information related to one or more interactive links. In one embodiment, information window 404 may be used to provide audio and/or video content related to an interactive link.

Figure 5:
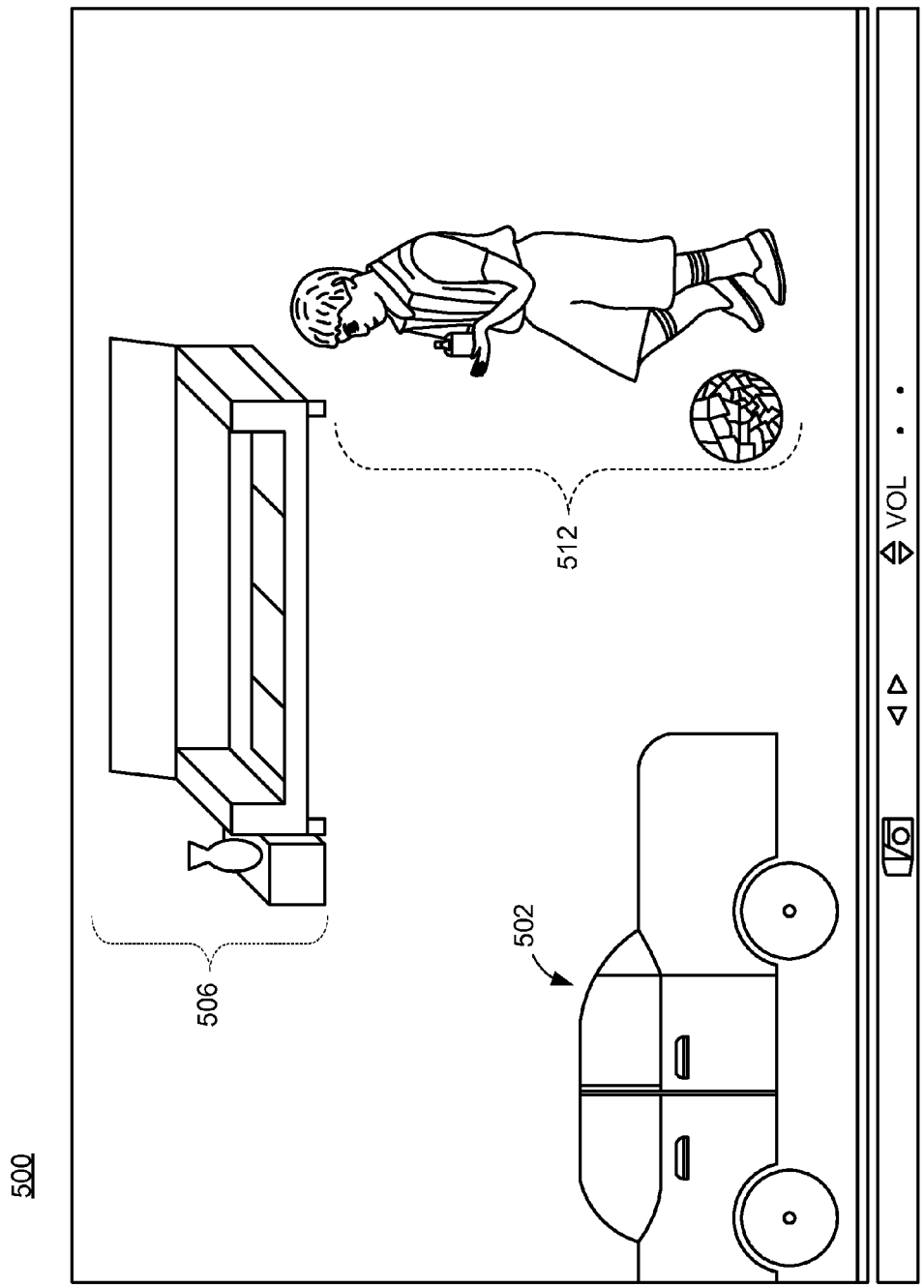
FIG. 5 is another illustration of a video frame with images/objects/people displayed therein during a standard view prior to enabling the interactive map links, according to an illustrative embodiment of the present invention.

FIG. 5 is another illustration of a video frame with images/objects displayed therein during a standard view prior to enabling the interactive map links, according to an illustrative embodiment of the present invention. Frame 500 comprises a number of visually identifiable objects within a video display window. In particular, Frame 500 comprises item collection (of some furniture and a vase) 506 and (model) automobile 502. Frame 500 also comprises screen boy segment 512 which further comprises a boy holding a drink and "moving" towards a soccer ball. Frame 500 of FIG. 5 and the associated components are further discussed in FIGS. 6-8.

Figure 6A:
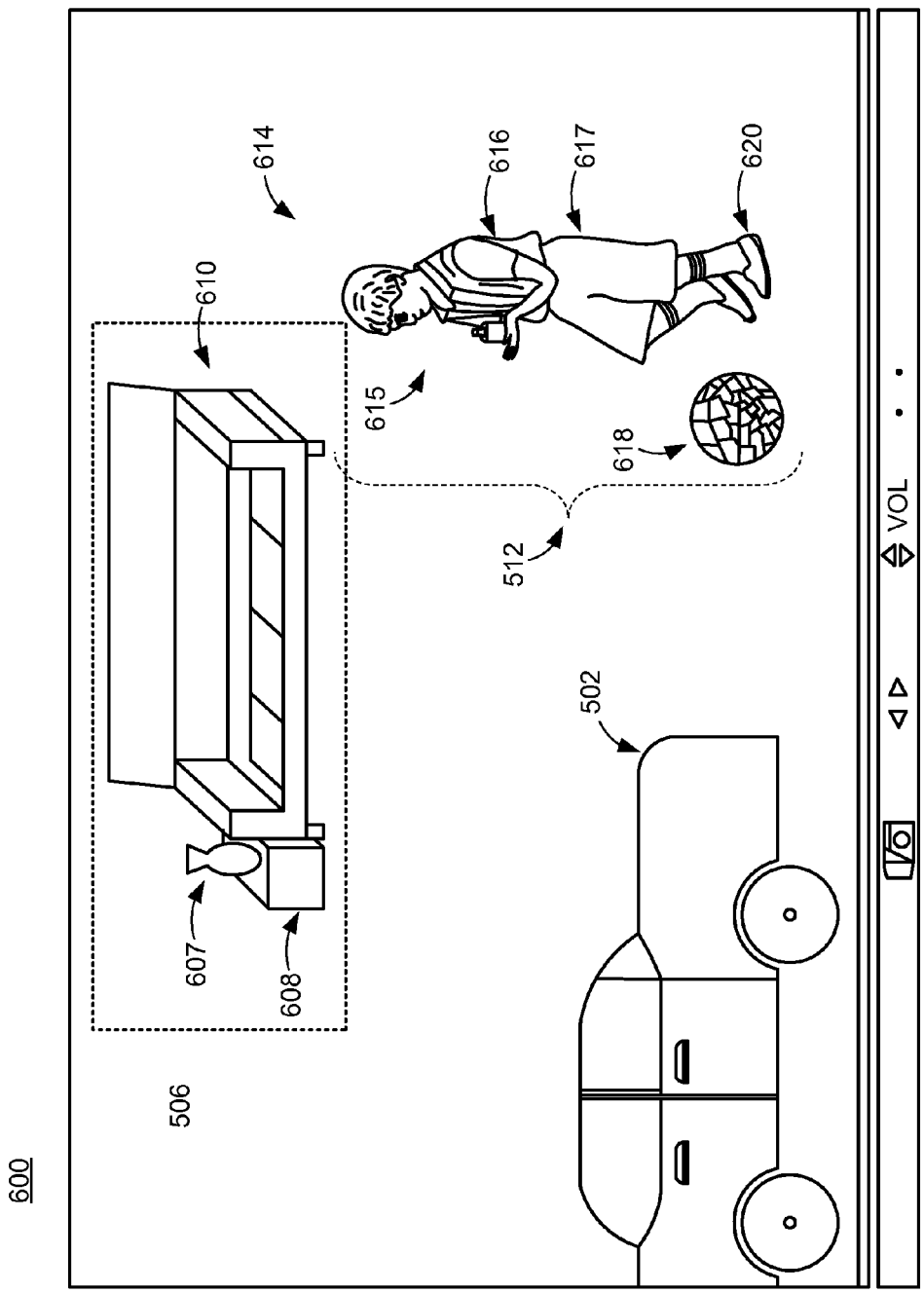
FIGS. 6A-6B illustrate two views of the video frame of FIG. 5 with the interactive map links enabled to highlighted features on one or more of the displayed images/objects/people and a corresponding link window for manipulating the map links, according to embodiments of the present invention.
Figure 6B:
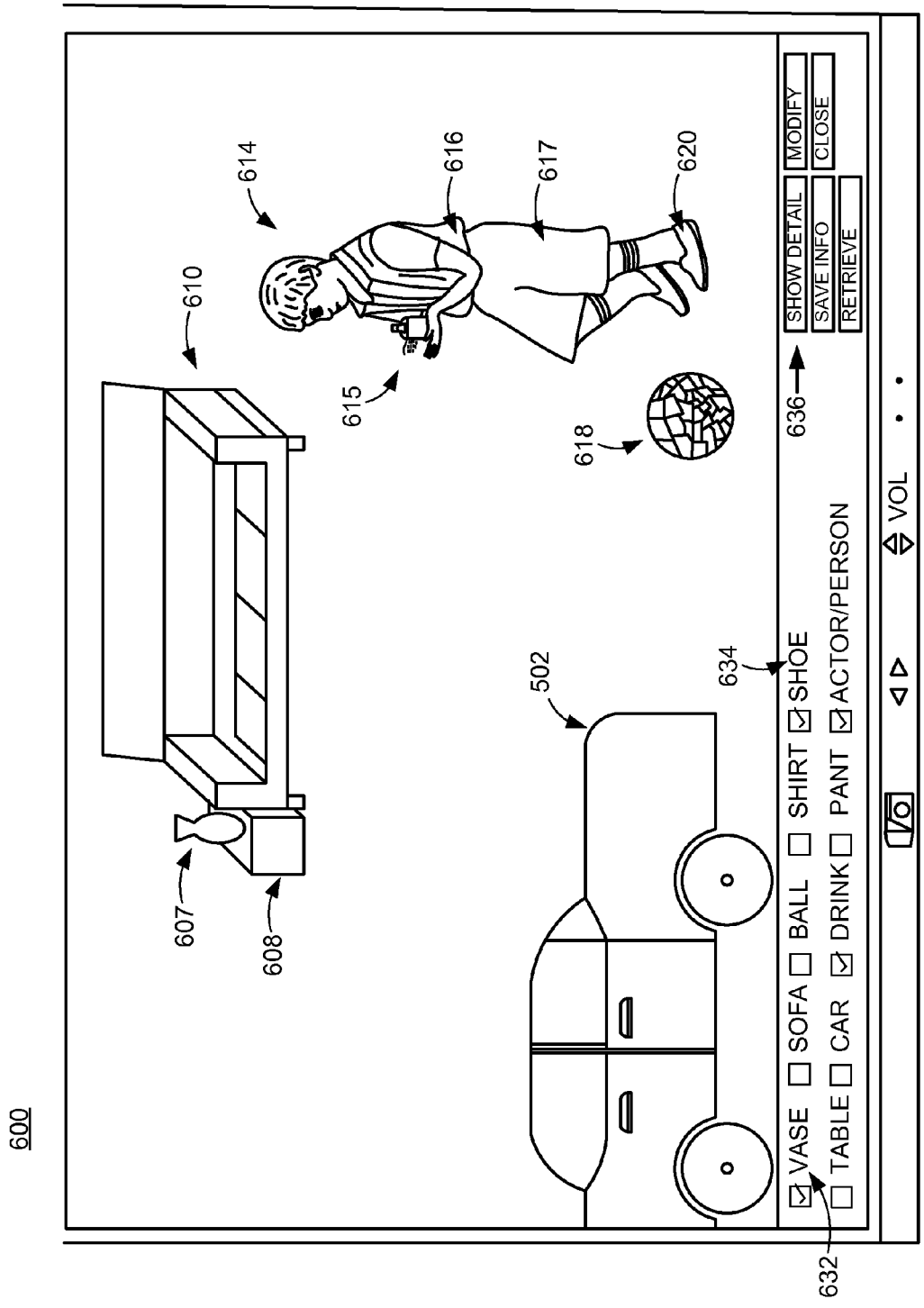

FIGS. 6A-6B illustrate two views of the video frame with the interactive map links enabled to highlighted features on one or more of the displayed images/objects and a corresponding link window for manipulating the map links, according embodiments of the present invention. Frame 600 illustrates an activated (invisible) link map and a collection of object components of the video sequence decomposed into individual objects. Frame 600 comprises a collection of items 506, automobile 502 and boy segment 512. Items 506 are visually distinguishable. However, OTLG utility 110 utilizes Object Recognition & Detection/Tracking Facility 112 to electronically/digitally decompose items 506 into individual objects/links including first vase (link) 607, table 608 and sofa 610. Similarly, OTLG utility 110 decomposes boy segment 512 into individual links including first boy (link) 614, drink (link) 615, shirt (link) 616, shorts (link) 617, shoes (link) 620 and ball (link) 618.

Figure 7A:
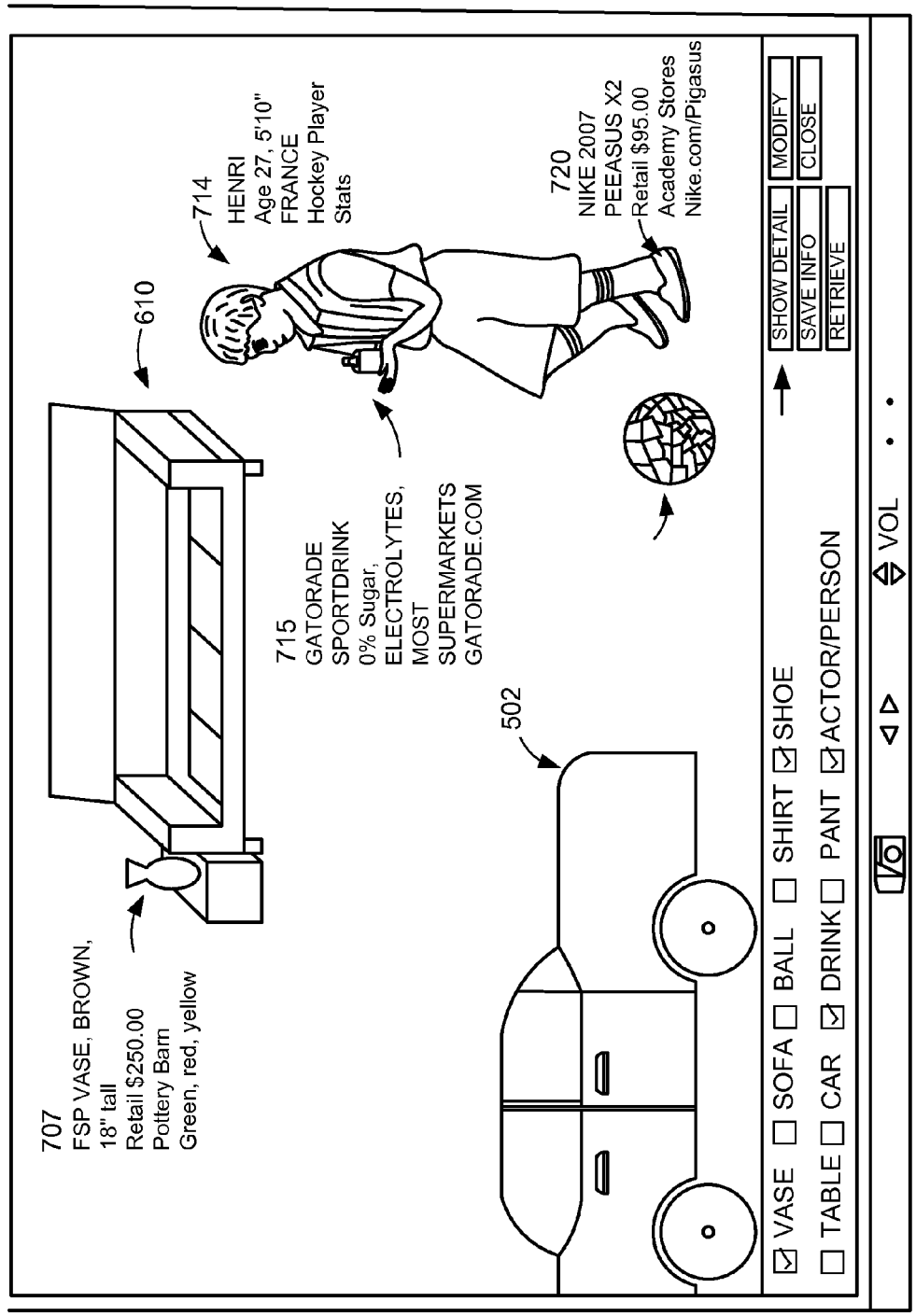
FIGS. 7A-7B illustrate a further level of interactive display on images/objects/people within the video frame when the interactive map links are highlighted/selected, where embedded information/content is provided directly on or adjacent to the highlighted feature, according to one illustrative embodiment of the present invention.
Figure 7B:
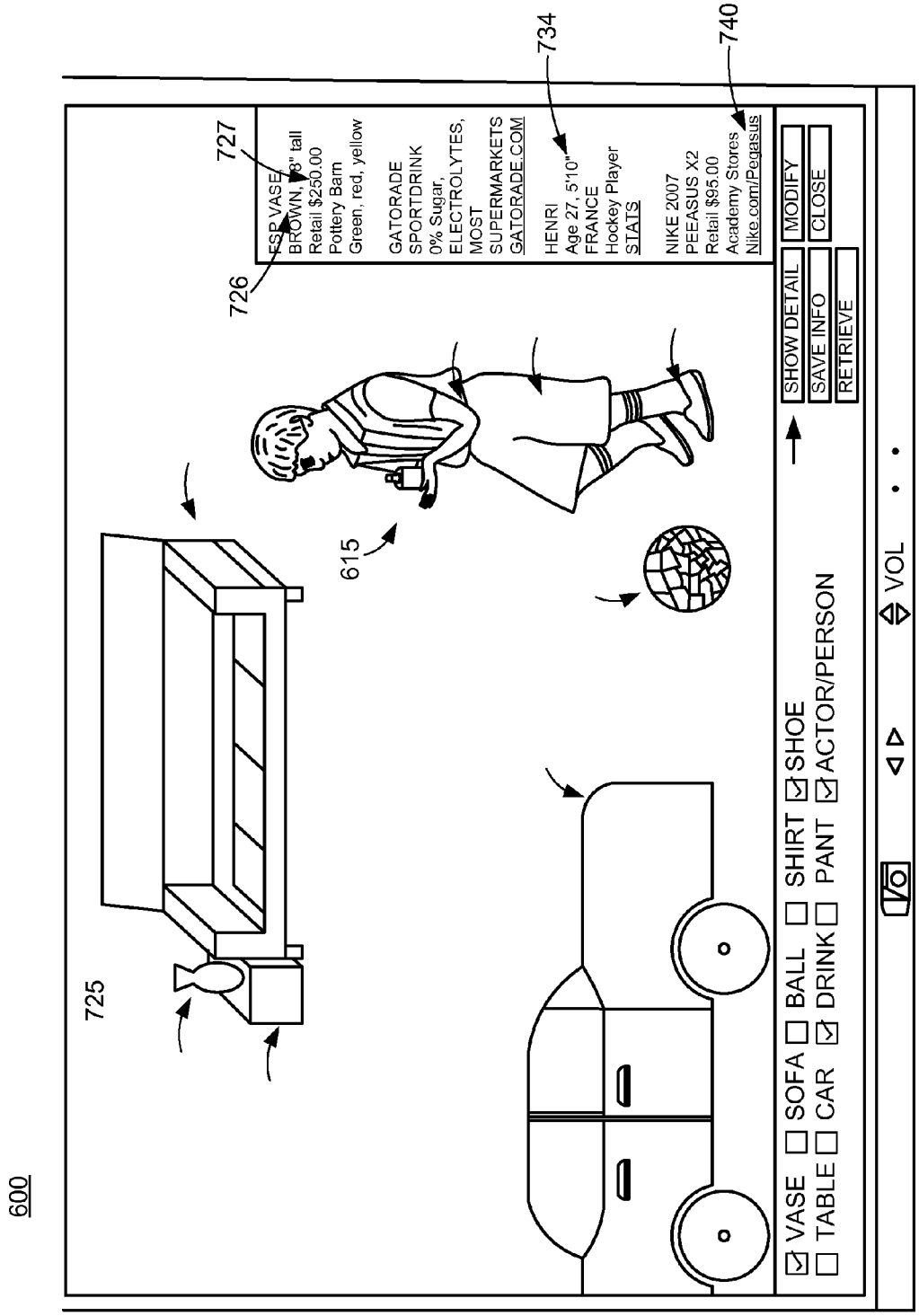

In FIG. 6B, a dashboard (e.g., dashboard 303) or a link viewer is illustrated. Dashboard 303 comprises a group of links including second vase link 632 and second boy link 634. OTLG utility 110 allows a user to select (for example, by check box within Dashboard 303) one or more links in order to access information/multimedia content (via "Show Detail" button 636, for example). FIGS. 7A-7B provide various ways of displaying the embedded information content.

FIGS. 7A-7B illustrate a further level of interactive display on images/objects within the video frame when the interactive map links are highlighted/selected, where embedded information/content is provided directly on the highlighted feature, according to an illustrative embodiment of the present invention. In Frame 700 of FIG. 7A, embedded content is displayed alongside the object corresponding to a selected link. In particular, Frame 700 comprises vase information (info) 707, boy info 714, drink info 715 and shoe info 720. Alternatively, in Frame 725 of FIG. 7B, OTLG utility 110 places embedded information content within information window 726. Window 726 comprises vase information (info) 727, boy info 734, and shoe info 734.

Figure 8:
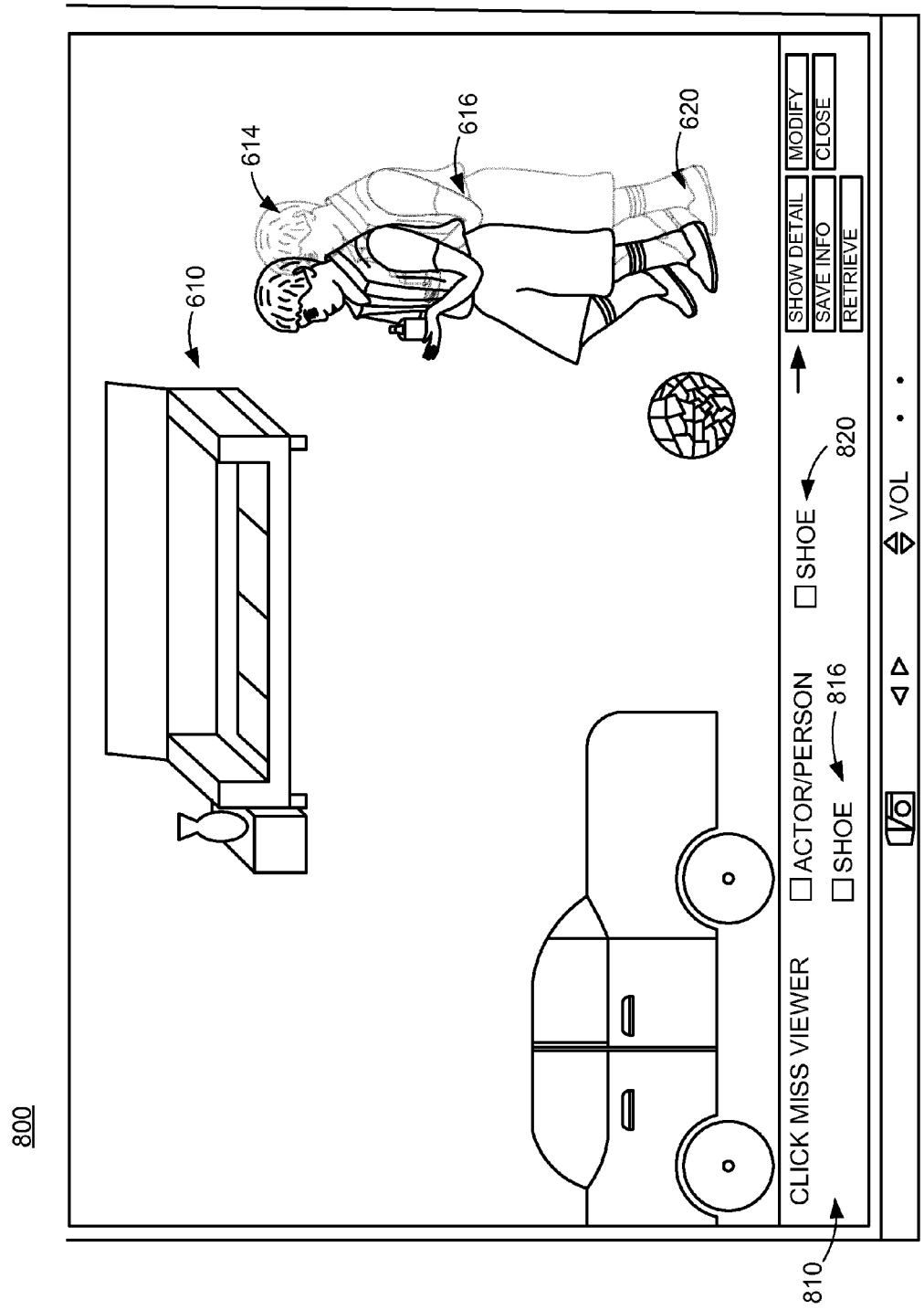
FIG. 8 is an illustration of the click-miss functionality provided by to enable use of the interactive features within a moving image, according to an illustrative embodiment of the present invention.

FIG. 8 is an illustration of the click-miss functionality provided by the invention to enable use of the interactive features within a moving image, according to an illustrative embodiment of the present invention. In Frame 800, a user attempting to access an interactive link has missed the target as a result of movement of the object or camera (recording the video sequence) relative to each other. OTLG utility 110 provides a user with a click miss facility to ultimately provide a user with access to the intended target. Frame 800 comprises missed links first boy (link) 614, shirt (link) 616, and shoes (link) 620. Frame 800 also comprises Click Miss Viewer 810 which further comprises a group of candidates that are targeted by the user including shirt (link) 816, and shoes (link) 820.

The (mouse) click miss facility displays a selection window/viewer 810 of interactive links present in a (pre-defined) region near the location of a mouse selection click which missed a (interactive link) target. Included in the selection box are interactive links in the space of the pre-defined region within a pre-set number of (link map) frames that were viewed prior to the mouse click miss and which include the frame upon which the mouse click miss occurred. The selection box provides another opportunity for the user to choose the interactive link the user had previously intended to follow.

Figure 9A:
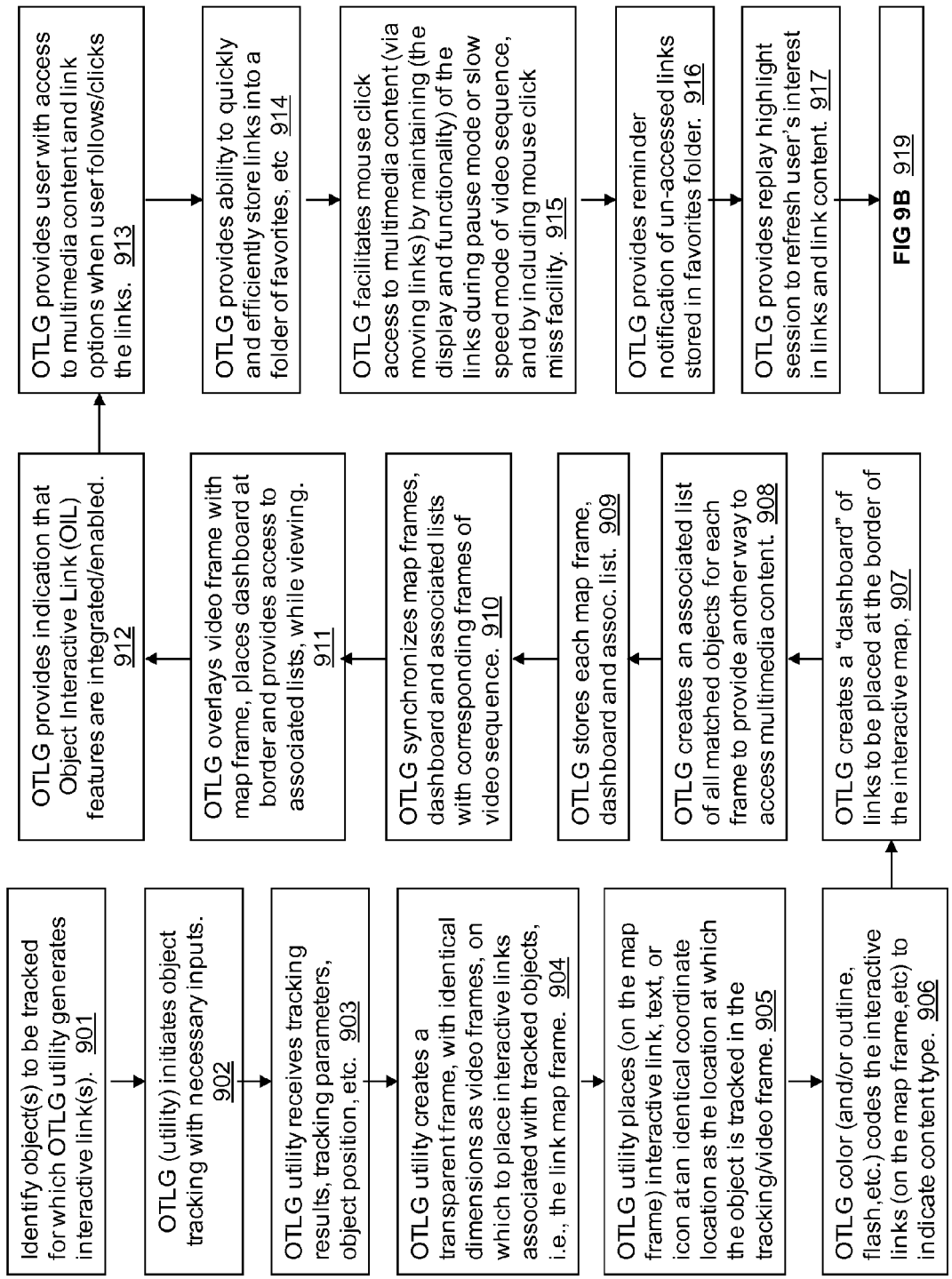
FIG. 9 (A-B) is a flow chart illustrating the process executed by the Object Tracking Link Generation (OTLG) Utility in generating, displaying, and manipulating interactive links for real-time accessing of multimedia content, according to an illustrative embodiment of the present invention.

FIG. 9 is a flow chart illustrating the process executed by the Object Tracking Link Generation (OTLG) Utility in generating interactive links for the real-time accessing of multimedia content, according to an illustrative embodiment of the present invention. Specifically, FIG. 9 illustrates the process of object identification, object tracking, and synchronized link map generation and integration (into live or pre-recorded media content), when executing the OTLG utility, according to one embodiment of the invention. The process begins at block 901, at which, OTLG utility 110 identifies an object in a video sequence for the purpose of tracking the object and generating an associated interactive link for accessing multimedia content when a user activates by a mouse click (or by voice/speech or by some other means) the interactive link associated with the tracked object. In a live television broadcast, the identification of the video object may take place during the earlier stages of the broadcast. A clear image (or set of images) of the object is extracted from an earlier stored frame of the live broadcast and the image(s) is later used to facilitate a subsequent tracking process. The links are then streamed along with the video and additional data that may be selectively accessed/displayed.

The extraction of object images may be executed by utilizing an image editing software within OTLG utility 110. Alternatively, the identification of video objects may take place prior to the commencement of the live broadcast. The images of the video object may not have been directly extracted from any portion of the live broadcast but may have already been acquired prior to the broadcast from earlier stored content. Consequently, object tracking may be initiated once the live broadcast begins. In pre-recorded content, an image of the video object may be taken from any stage within the video sequence in which the object is subsequently tracked. The image may then be used to begin tracking at any stage within the video sequence. With pre-recorded content, the tracking methodology used is not restricted by processing time as is the methodology used in the live broadcast content (with OIL features activated).

In addition to providing images of the objects, OTLG utility 110 may also identify the objects by a name ID, an interactive link ID, and an icon ID. These ID's may be further identified by color and/or flash graphics, for example. Alternatively, a set of defaults may be applied to the further identification of the object ID's. In one embodiment, OTLG utility 110 determines an appropriate color or set of colors for the ID's based on the color(s) of the input object image.

As an example of the application of the features of the invention to a live feed, a US Open tennis match featuring two female tennis players may provide an interactive link on the outfit, tennis racquets, bags, and other gear of each player. A consumer looking at the match may turn on the interactive features (via the remote control or other selection/activation mechanism). With the interactive feature on, the consumer is able to highlight and view additional content/information about both players' clothing, tennis racquets, and other gear. Examples of this additional information include (a) the manufacturer/designer (Reebok, Wilson, Ebony Star), (b) cost, and (c) retailers (GolfSmith®, Academy®, Reebok.com) of the specific item highlighted by the consumer. Highlighting of the item may entail placing a cursor over the item or on an active link associated with the item (where the link may be either adjacent/proximate to the item or listed within the dashboard, separate from the item(s)), as an example.

At block 902, OTLG utility 110 initiates the tracking process by providing the necessary inputs to the tracking mechanism. In particular, OTLG utility 110 provides the tracking mechanism with images of video objects to be tracked, the ID's of the objects, and the input video sequence within which the objects are tracked frame by frame.

At block 903, OTLG utility 110 creates a transparent frame with a size identical to the size of a video frame. On this transparent frame, interactive links corresponding to tracked video objects are subsequently placed, creating a map frame of interactive links. OTLG utility 110 then receives the results of the tracking mechanism, as shown at block 904. These results include the tracking parameters which include the location of the tracked object within the video frame. The tracked object may (on an average) span a number of pixels in width and in length. OTLG utility 110 may identify a center location of the object's span as the object's location for the purpose of placing an interactive link in a matching location on the map frame. OTLG utility 110 uses the horizontal and vertical coordinates of the location of the tracked object in the video frame to place an interactive link in an identical coordinate location on the link map which is synchronized (in time, size, etc.) with the video frame in which the object is last tracked, as shown at block 905. OTLG utility 110 may alternatively determine the center location similar to the method in which a center of mass location (for a 2-D object) is determined.

At block 906, OTLG utility 110 color (and/or outline, flash, etc.) codes the interactive links (on the map frame, etc) to indicate content type. At block 907, OTLG utility 110 creates a "dashboard" of links to be placed at the border of the interactive map. OTLG utility 110 creates an associated list of all matched objects for each frame to provide another way to access multimedia content, as shown at block 908. OTLG utility 110 also stores each map frame, dashboard and associated list, as shown at block 909. As further shown at block 910. OTLG utility 110 also synchronizes map frames, dashboard and associated lists with corresponding frames of video sequence.

At block 911, OTLG utility 110 overlays the video frame with the associated map frame (which is synchronized with the video frame) of interactive links. For a live broadcast, a minimal delay allows this process of tracking an object in a video frame and placing a link on the link map (corresponding to a tracked video frame location) to occur seamlessly. If there is no time delay allotment, a higher tracking rate mechanism may be employed. The higher tracking rate requires a higher frame sampling rate. When the frame sampling rate is ideally increased, the difference in object position from frame to frame is virtually undetectable by the human eye. This undetectable difference allows OTLG utility 110 to track an object in one video frame and place the corresponding interactive link on a map frame which overlays the next video frame rather than on the map frame which overlays the current video frame. Alternatively, a tracking methodology with an integrated prediction facility allows OTLG utility 110 to maintain the tracking rate and place the interactive link in the link map overlaying the current video frame, during a live broadcast.

The interactive links may be activated in numerous ways, including by mouse click, keyboard, by speech, etc. For pre-recorded video content, the link map for each frame may be compiled and saved. Subsequently, these link maps may be synchronized with the corresponding video frame for ideal playback.

The rate at which the map frame with interactive links is updated may be equal to the video frame rate or less than the video frame rate. OTLG utility 110 may choose to update links on the map frame at half the video frame rate, for example. Identifying the location of a tracked object as a central point within the object's span allows the links on the map frame to essentially remain overlaid above the tracked object. However, tracking results may not be directly used at each video frame appearance to place interactive links on each corresponding map frame.

At block 912, OTLG utility 110 provides indication that Object Interactive Link (OIL) features are integrated/enabled. When Object Interactive Link (OIL) features of OTLG utility 110 are activated, the map frame with interactive links may appear, in accordance with a continuous or continual mode. In the continuous mode, each frame of the video sequence has an associated (and available) map frame overlaying a video frame. A user still has a choice of making the map frame and links invisible. In the continual mode, a number of sequential frames may have an associated (and available) map frame overlaying each video frame, for a limited cyclic interval within the video sequence. Thus, this interval may be followed by another interval (or set of intervals) with no available map frame to overlay a video frame. For example, the map frame may only be available at every third interval.

The continual map frame mode particularly facilitates a manual tracking method for pre-recorded content. In the manual tracking method of pre-recorded content, an operator analyzes each appropriate video frame within the video sequence and locates the object being tracked. Upon identifying the object in each video frame, the operator places an interactive link in a map frame location having the same intra-frame coordinates of the tracked object in the video frame. (The operator may also maintain, without updating, the same map frame of links over a number of frames depending on the amount of change in object location detected from frame to frame. In addition, the operator may also choose to turn off the map links on a number of sequential frames and later re-introduce the map frame in a cyclical manner.) In addition, the operator may choose the intervals for tracking and for turning off the tracking such that a user/viewer has sufficient time (during tracking intervals) to follow/activate links (by mouse click) and has a short waiting period (during the non-tracking intervals) before the re-appearance of the interactive link map. In the continual mode, a viewer may still access links by using the pseudo-tracking (partial tracking) links in the dashboard or the links that appear in the interactive list.

OTLG utility 110 provides another means of accessing content through interactive links by providing a list of links which appeared in the link map or the dashboard within a pre-set number of frames of (a user's) accessing the list. By mouse clicking on an interactive link from the link map, from the dashboard or from the list, a user may access multimedia content and other link options, as shown at block 913. At block 914, OTLG utility 110 provides other link options which include a facility which allows a user to save the link in a folder, for example, a "Favorites" folder. OTLG utility 110 may use a folder that identifies the stored links for a particular video sequence.

At block 915, OTLG utility 110 facilitates mouse click access to interactive links, especially to links which may change position from one frame to the other, by allowing OIL features to remain functional when the video sequence is viewed in slow speed or if the video sequence is paused. In addition, OTLG utility 110 provides a feature which may be referred to as the "mouse click miss" facility. The mouse click miss facility displays a selection window of interactive links present in a (pre-defined) region near the location of a mouse click which missed a (interactive link) target. Included in the selection box are interactive links in the space of the pre-defined region within a pre-set number of (link map) frames that were viewed prior to the mouse click miss and which include the frame upon which the mouse click miss occurred.

The selection box provides another opportunity for the user to choose the interactive link the user had previously intended to follow.

Provisions for missed selections (e.g., from a mouse click that failed to occur over an intended interactive target) in the region of a link, gives a user a next chance to access the link by providing a popup box to choose a link the user intended to follow. The popup box provides a set of links which were in/near the location of the click (in previous number of frames about the time of the click) and the next closest links (to that mouse click miss). This has general application.

At block 916, OTLG utility 110 also provides a reminder feature/facility which provides a user with an automatic notification of un-accessed (based on an OIL history) links which may have been stored in the Favorites folder. A user may also choose to activate the reminder feature for previously accessed links which the user may wish to again review at later time.

At block 917, OTLG utility 110 also provides a links highlight replay session comprising multimedia components based on links stored in the Favorites. The replay session, which is an interactive semi-automatic multimedia presentation directed by user prompts, may focus on all stored links for a particular video sequence or on the un-accessed links only. The replay session re-invigorates (or refreshes) a user's interest in the link content by providing the user with highlight content in the form of video, images, photo slides, text descriptions, audio, or a combination of some or all of these multimedia forms. The highlight content may focus on a particular object or set of objects associated with the respective links. A highlight session component for a particular interactive link may be a 20 second commercial, for example, of the object of the interactive link.

While a user is viewing the original video content, OTLG utility 110 may periodically notify the user of a highlight session file accessible on the medium upon which the video sequence is running. The highlight session file may also be obtainable (for downloads) at a specified web address. The user may download highlight session components or save links to later access components/content. Alternatively, OTLG utility 110 may pre-compile a highlight reel/component for each object or may use an automatic process which selects object images from the appearances of the object in the video sequence. OTLG utility 110 may employ, for example, various effects, including slow motion, and various angle views not seen during the video sequence. While viewing the highlight session, the user may pause the video, skip video segments, access links, etc. The user may also save session details so that the user may later continue viewing the highlight session at the appropriate point in the session.

In one embodiment, OTLG utility 110 provides real-time link advertisements in an information/shopping window. OTLG utility 110 enables user configuration of link ads. A user may enable display of all links in the info window or a subset of related links in the info window. For example, the info window may display links for clothing items only. Thus, a link ID parameter may provide an object type information which is utilized by OTLG utility 110 to determine whether the object is included in advertisements within the links advertisement window. For example, during the display of a tennis match, OTLG utility 110 may invite a user via an information window to purchase athletic gear with the following interactive text link: "Buy Federer's racquet/gear right now". The invitation may be associated with the relevant object icon and/or video advertisement which also provide links to initiate specific actions with respect to the particular item(s).

At block 921 (of FIG. 9B), OTLG utility 110 dynamically determines a "link congestion" factor. Link congestion provides a measure of the spacing of interactive links. Link congestion depends upon a number of factors including: (a) the displayed size of an object; (b) a degree of overlapping of displayed objects/images; and (c) processing time considerations.

In order to provide easy access to links which are affected by a high link congestion factor, OTLG utility 110 automatically utilizes/provides a second display window which resizes one or more segments of the displayed scene in order to provide an optimal link congestion factor for a group of affected objects, as shown at block 922. This window, which may be referred to as a zoom window, allows a viewer to initiate a zoom feature to resize the object to allow the user to inspect objects, identify objects and activate distinguishable interactive links. The second display window allows a viewer to enjoy uninterrupted viewing of the running video sequence. OTLG utility 110 also provides a user with the option to configure a non-interrupt mode or an interrupt mode when additional display windows are activated and/or links are accessed. Thus, OTLG utility 110 enables separation of video sequence monitoring from other activities initiated by the interactive capabilities of OTLG utility 110 allowing uncompromised high quality viewing of video sequences.

Furthermore, OTLG utility 110 may combine a number of associated links into single composite link in the regular video display window during display instances experiencing a high link congestion factor. For example, separate links for Venus' shorts and blouse may be combined in a single link for Venus' gear. Upon accessing a composite link, OTLG may provide a user with the option of selecting either a link to Venus' shorts or the link to Venus' blouse.

At block 923, OTLG utility 110 also provides a facility for speech activation of OIL features. OTLG utility 110 may activate/utilize a speech/object recognition facility which provides a user with additional links. For example, a speech recognition facilitated link may be provided to allow (via an interactive link) a user to view the record of a sports team when a commentator within a video sequence utters the words "Team A's record", for example. Thus, interactive links may be provided to link displayed objects to content as well as spoken words/phrases to multimedia content. Additionally, a user/viewer may be able to access (via a link) a page of search results for a particular word or phrase that is detected.

Thus, OTLG utility 110 integrated with speech/object recognition technology provides a facility for associating speech with an object/image. For example, by employing speech recognition technology, a detected phone number (uttered in a video scene) may activate a facility that allows a viewer to make a phone call. Similarly, emails may be composed and sent to (detected) email addresses via a facility for composing and sending emails. A user may access websites, may send text messages, vote, take polls. Object recognition may be employed to detect text (objects and icons), which, for example, may be/represent a phone number displayed on screen, and apply interactive link features to the text or object. A user may initiate any of above action by clicking on link which opens in a new window (running a particular application, for example) for user to continue and complete the action. Alternatively, objects may have a preset interactive functionality. A specific displayed email address, telephone number, website address, etc., may be an object that is initially identified as an object to be tracked/detected/identified. Upon detection of the object in any video frame, a specific action is initiated when the link is activated by a user.

The interactive links may also provide a means for opening an additional window to view a replay of some part of the video sequence, as shown at block 924. In addition, the interactive link may allow the user to focus on a particular object or set of objects within the replayed part of the video sequence. OTLG utility 110 also provides the user with the opportunity to place the replayed part of the sequence in a continuous repeat mode. Whenever an interactive link first appears in a video sequence, a viewer receives notification (with a brief description of link content) of the appearance of a new link. OTLG utility 110 provides viewers with frequent link notifications (with verbal notification option with a signature sound alert). A link notification may inform the viewer of a new link appearance, an updated link appearance, the number of interactive tracking links (in a current frame), the number of pseudo-tracking links, the number of video links, the number of image links, a preview of a future/upcoming interactive tracking link, etc. A featured link (or set of links) on each frame with an outstanding link appearance is also provided by OTLG utility 110.

In one embodiment, OTLG utility 110 also provides a viewer/user with a facility to allow user to be notified when a particular video sequence commences, as shown at block 925. As an example, OTLG utility 110 may provide a form by which a user provides a name/identification for a video sequence (event) which begins at some unknown time in the future. Whenever the video sequence begins, OTLG utility 110 notifies the user of the event, although the viewer may be viewing another channel. In one embodiment, a user may choose to receive notification via text message, for example, to ensure that a user receives notification especially when the user has physically moved away from the television system or video player. For example, on a music video channel, OTLG utility 110 may detect that a particular music video is about to begin and alert a (television) viewer. In one embodiment, OTLG utility 110 may provide a user/viewer with the option to initiate recording of the desired video sequence once the sequence begins. OIL may also provide a coming soon feature (and, alternatively, a currently playing feature) which uses a popup box (in the dashboard area or in some other window) and/or enables the flashing of the interactive link itself. This "upcoming"/"currently playing" feature informs a viewer/user of an upcoming, new, updated link, etc. OTLG utility 110 may also allow a user to search within pre-recorded video sequence for all instances of an object that has been previously tagged/identified to initiate the search process. The results may be displayed in another display window and may also be saved.

All OIL features which include the interactive map of links, dashboard, etc., remain functional after a copying/recording of a video sequence which contains the OIL features and functionality. OIL allows a user to save clicked objects/representative icons, including images, sound file(s), etc. A mouse rollover of a link may provide a user with content information via brief text or some other indicative icon. For example, a camcorder icon may indicate that a particular link may lead to other video content.

In one embodiment, OIL may first identify the dominant colors of a tracked object to determine the appropriate color of an interactive text link or interactive icon. The actual link is colored to allow the link to remain visible while link features are active. A user may select the color desired for the links and may effect a color change in real time.

In one embodiment, whenever a user activates an interactive link to some other content, the original sequence continues to play without interruption, as shown at block 926. A new window is opened to enable viewing of the linked content. In one embodiment, when the other content is also a video sequence, the video in new window is in stop or pause mode. When the user chooses to view the linked (second) video, the first video is automatically stopped or paused. If the first video is a live sequence, the sequence may be recorded to allow the user to subsequently access the complete video content. Alternatively, OIL may mute the sound of the first video (which still plays) while the second video plays with full sound.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As described herein, the illustrative embodiments provide a method for providing linked content within an electronic display. The method comprises: receiving the linked content, including link information associated with one or more viewable images within the linked content; displaying the linked content on a display device; enabling manipulation of a selecting affordance that enables individual identification of specific ones of the viewable images within the linked content displayed on the display device; in response to a selection via the selecting affordance of one of the viewable images with an associated link information, automatically providing additional information corresponding to the selected viewable image, wherein the additional information is hidden from view when the selected viewable image is not currently being selected by the selecting affordance; and enabling access, via a secondary source, to third party information related to the selected viewable image when a link corresponding to the selected viewable image is subsequently selected.

The additional information includes a selectable link, that when selected triggers an access to the secondary source. Further, enabling access comprises: detecting a selection of the selectable link; retrieving, via the selectable link, an address corresponding to a location of the third party information at the secondary source; and generating a query that includes the address and transmitting the query to the secondary source via an external connection to the secondary source.

Thus generally, the described embodiments of the invention provides a method and multimedia device that enables the following functions: (1) identifying one of a plurality of objects within one frame from a plurality of frames in a video (image) sequence to be tracked in a number of other frames from the plurality of frames in the video sequence; (2) tracking the one of the plurality of objects in the number of other frames from the plurality of frames in the video sequence, in order to generate a dynamic interactive link for a tracked object as said tracked object may change appearance and location within the video sequence; (3) utilizing a set of tracking parameters to determine a location of a tracked object on a display to determine the ideal placement of an interactive link and the ideal color of said interactive link; (4) generating a transparent frame with an identical set of dimensions to the other frames, upon which interactive links are placed; (5) placing the interactive links unto the transparent frame with the use of the set of tracking parameters (i.e., creating an interactive link map); (6) providing a control option to turn the map off and on; (7) overlaying a frame from the number of other frames with the interactive link map, in synchronization with said frame; (8) ideally synchronizing the interactive map link with the frame, in order to respond to any changes in frame size, frame speed, and frame positioning; and (9) accessing multimedia content by activation of the interactive map links.

Further embodiments provide: (10) providing a list of the interactive links (of the map) as a next way to access multimedia content; (11) providing a set of interactive links at a border of the map as an alternative way to access the multimedia content; (12) maintaining a functionality of the interactive links during the changes in frame size, frame speed, frame positioning, while the video sequence is paused and while viewing a dvd, cd, and other formatted copies (reproductions) of the video sequence with interactive links; (13) coding of the interactive links to determine when the multimedia content is primarily audio, video, image, and text; and (14) providing a set of interactive links at the border of the map without directly tracking the object, in order to provide a link for an appearance of the object within a sequence of associated frames and to provide other associated interactive links.

Additional embodiments provide: (15) when a mouse click miss occurs near to a location of a interactive link, displaying a selection (popup) window for a user to select one of a plurality of link options, wherein said link options are within a certain pre-set distance from the coordinate location of the mouse click miss on the frame that was displayed at the time of the mouse click miss and also link options within the certain pre-set distance from a coordinate location identical to the coordinate location of the click miss, on a pre-set number of frames previously displayed before the mouse click miss; (16) alternatively, placing the dashboard at the bottom of the display screen where tracking results may be demonstrated with a single dimension, i.e., by horizontal coordinate of tracked object, and also by vertical coordinate of tracked object; (17) alternatively, utilizing a first dashboard to place horizontal coordinate tracking results and a second dashboard to place vertical coordinate tracking results, wherein said dashboards are aligned perpendicularly to each other; and (18) alternatively, resizing the frames to create a vertical space and a horizontal space for the dashboards.

Finally, additional embodiments provide: (18) providing access to links by the use of speech; (19) when a link is being accessed: opening a window to view content, wherein said window is a smaller window which is opened so as to minimize an obstruction to the viewing of the video sequence; (20) when the link content in window is a second video sequence: automatically pausing the second video sequence until the user decides to run the second video sequence; and providing zoom capability in the second window, in order to view a particular object close up. Other embodiments are described herein and it is appreciated that the present invention covers all such embodiments and their equivalents, without limitation.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

What is claimed is:

1. A method for providing linked content within an electronic display, the method comprising:
receiving the linked content, including link information associated with one or more viewable, automatically tracked images within the linked content;
displaying the linked content on a display device;
enabling manipulation of a selecting affordance that enables individual identification of specific ones of the viewable, automatically tracked images within the linked content displayed on the display device;
wherein the selecting affordance is associated with a dynamic link object which is placed at a position that is determined based on automatic object recognition and tracking of a corresponding viewable image;
in response to a selection via the selecting affordance, of one of the viewable, automatically tracked images with an associated link information: (a) automatically providing additional information corresponding to the selected viewable, automatically tracked image, wherein the additional information is hidden from view when the selected viewable, automatically tracked image is not currently being selected by the selecting affordance; and (b) automatically generating object position and location within a video frame of an image from an extracted image of the object of one or more functional features associated with the object;
enabling access, via a secondary source, to third party information related to the selected viewable image when a link corresponding to the selected viewable, automatically tracked image is subsequently selected;
wherein use of one or more extracted image and object(s) from one video frame or a subset of video frames is used in an object recognition procedure to automatically identify the object in other frames and automatically generate the position of the identified object in the other frames;
determining a first link congestion factor that provides a measure of the spacing of a collection of interactive links within the video frame; and
in response to a determination that the first link congestion factor reaches a high link congestion factor, automatically providing a second display window that enables components corresponding to the collection of interactive links to be re-sized to provide a second link congestion factor to enable a user to identify and select between distinguishable interactive links.

2. The method of claim 1, wherein:
the additional information includes a selectable link, that when selected triggers an access to the secondary source; and
said enabling access comprises:
   detecting a selection of the selectable link;
   retrieving, via the selectable link, an address corresponding to a location of the third party information at the secondary source; and
   generating a query that includes the address and transmitting the query to the secondary source via an external connection to the secondary source.

3. The method of claim 1, further comprising:
identifying an object of a plurality of objects within one frame of an image, wherein the image is one frame of a plurality of frames of a running multimedia sequence;
generating a dynamic interactive link corresponding to the object;
associating the dynamic interactive link to the object; and
tracking the object via the dynamic interactive link, as the object is presented within other frames of the plurality of frames, wherein the object is tracked as the object changes appearance and location within the running multimedia sequence.

4. The method of claim 3, said associating the dynamic interactive link further comprising:
determining a location of the object on a display;
determining an ideal placement of the dynamic interactive link, utilizing a set of tracking parameters; and
selecting a set of optimal characteristics for displaying the dynamic interactive link, said set of optimal characteristics comprising one or more of a color of the dynamic interactive link, a relative brightness of the dynamic interactive link compared to a brightness of the object and a background on which the object is displayed, a size of the dynamic interactive link, and a shape of the dynamic interactive link.

5. The method of claim 4, further comprising:
generating a transparent frame having similar dimensions to the plurality of frames;
placing one or more dynamic interactive links on to the transparent frame at the ideal placement for each of the one or more dynamic interactive links to generate an interactive link map;
overlaying each frame of the plurality of frames with the transparent frame to associate the interactive link map with the corresponding objects to which each of the one or more dynamic interactive links correspond;
selectively enabling dynamic interactive links of the transparent frame to be visible by turning on view-enable features of the transparent frame in response to a trigger;
monitoring for receipt of the trigger to turn on the view-enable features of the transparent frame; and
maintaining the transparent frame in an invisible state when the view-enable features are turned off.

6. The method of claim 5, further comprising:
overlaying each of the plurality of frames with a modified version of the interactive link map, which provides a modification of a presence and/or location of each dynamic interactive link within a modified version of the overlay frame to track a relative presence and location of each viewable object in each new frame of the plurality of frames; and
synchronizing the interactive map link with the new frame, including synchronizing the interactive map link to correspond to any detected changes in frame size, frame speed, and frame positioning.

7. The method of claim 4, further comprising:
detecting a request for listing all interactive links within one or more frames;
providing a list of the interactive links within one or more of an overlay view, a dashboard view, and a frame border view in response to the request, wherein the frame border view provides a set of interactive links at the border of an interactive link map without directly tracking the objects within the frame; and
dynamically accessing multimedia content by activation of a functional feature associated with a selected dynamic interactive link.

8. The method of claim 4, further comprising:
enabling functionality corresponding to an interactive link map during a display of content from a multimedia device, including one or more of a digital video disc (DVD), compact disc (CD), an other digital media;
maintaining a functionality of the dynamic interactive links during changes detected in frame size, frame speed, and frame positioning; and
enabling the functionality for dynamic interactive links within a paused frame when a running multimedia sequence is paused.

9. The method of claim 1, further comprising:
detecting when a coordinate location of a mouse click miss occurs within a preset distance from one or both of a previous and a current location of an interactive link corresponding to a moving object; and in response to detecting the mouse click miss within the preset distance, automatically displaying a new selection window, which enables selection of one or more of a plurality of link options, wherein said selection of link options includes one or more of: (a) selecting from among a set of identified selectable links within the preset distance from the coordinate location of the mouse click miss on a current frame being displayed at a time the mouse click miss is detected; and (b) selecting from among a displayed set of selectable links that were located within a small perimeter distance of the coordinate location within a pre-set number of frames previously displayed before the mouse click miss was detected.

10. The method of claim 1, further comprising:
displaying information corresponding to the viewable object within the linked content within a dashboard provided at one of:
  (a) a single location of the display screen, wherein the viewable object within the linked content is identified with a single dimension entry of the dashboard, wherein said displaying includes providing a horizontal coordinate and a vertical coordinate of the viewable object relative to the linked content within a video frame; and
  (b) two or more locations of the display screen selected based on a horizontal coordinate position and a vertical coordinate position, wherein the two or more locations align each section of the dashboard perpendicularly to each other; and
resizing video frames relative to the display device to create one or more spaces for location of the dashboards.

11. The method of claim 1, further comprising:
enabling access to the information associated with the interactive links by use of audio input, including speech;
converting a received audio input to a text representation;
connecting the text representation to an identifier (ID) of a viewable object, which ID most closely matches the text representation of the received audio input; and
automatically providing access to information related to the viewable object with the matching ID, wherein said automatically providing comprises one or more of:
opening a second window to view the information;
retrieving the information into the second window, said retrieving including retrieving from the secondary source when retrieval from the secondary source is required;
enabling zoom functionality in the second window; and
in response to the retrieved information in the second window being a next running multimedia sequence: automatically pausing the next running multimedia sequence; and waiting for detection of an input to play the next running multimedia sequence.

12. A method for providing access to linked content within an electronic display, the method comprising:
generating interactive links to enable a user to access content associated with tracked image objects within a video frame;
displaying the linked content on the electronic display in response to a selection of one or more of the interactive links;
determining a first link congestion factor that provides a measure of the spacing of a collection of interactive links within the video frame; and
in response to a determination that the first link congestion factor reaches a high link congestion factor, automatically providing a second display window that enables components corresponding to the collection of interactive links to be re-sized to provide a second link congestion factor to enable a user to identify and select between distinguishable interactive links.

13. The method of claim 12, further comprising:
providing access to content associated with a tracked image object of a video frame by utilizing a secondary interactive link positioned external to the video frame, wherein said secondary interactive link has at least one of a substantially identical horizontal coordinate as a primary interactive link within the video frame and a substantially identical vertical coordinate as the primary interactive link within the video frame.

14. The method of claim 12, further comprising:
combining a number of associated interactive links into a single composite link in a video frame if the spacing of tracked, displayed objects are associated with a high link congestion factor;
detecting when the user accesses the composite link; and
in response to the user accessing the composite link, providing the user with a selecting affordance to enable the user to select an interactive link from among the number of associated interactive links and access content associated with the interactive link selected.

15. The method of claim 12, further comprising:
detecting when a particular set of words is spoken within a video sequence;
associating the particular set of detected spoken words with at least one of a displayed image object and a displayed icon, wherein said at least one of the displayed image object and the displayed icon represents the spoken words within the video sequence; and
providing, within a display frame, interactive links corresponding to content associated with the particular set of spoken words detected.

16. A method for providing access to linked content within an electronic display, the method comprising:
generating interactive links to enable a user to access content associated with at least one of displayed objects within a user-interface and tracked image objects within a video frame;
associating the generated interactive links with respective objects within at least one of a user-interface and a video frame;
enabling the user to store interactive links associated with the respective objects; and
providing the user with an automatic reminder notification that can be activated by the user and which prompts the user to review information associated with at least one of (a) user stored interactive links associated with content that has not been accessed by the user and (b) user stored interactive links associated with content that has already been accessed by the user, wherein the user has indicated a desire to review the accessed content at a later time period;
determining a first link congestion factor that provides a measure of the spacing of a collection of interactive links within the video frame; and
in response to a determination that the first link congestion factor reaches a high link congestion factor, automatically providing a second display window that enables components corresponding to the collection of interactive links to be re-sized to provide a second link congestion factor to enable a user to identify and select between distinguishable interactive links.

17. The method of claim 16 further comprising:
initiating, utilizing the user stored interactive links, a links highlight replay session which provides, as a reminder notification, selected content to the user including the object associated with the interactive link.

18. The method of claim 17, further comprising:
enabling the user to direct a presentation of the highlight replay session by user prompts which enables a user to focus on a particular set of objects associated with the respective links within in the presentation of the highlight replay session and a form of multimedia content for respective links; and in response to multimedia objects and content being presented to the user, providing the user with a notification indicating that a highlight session file, which can be downloaded, is available for presentation to the user, wherein the highlight session file is at least one of (a) pre-compiled highlight components and (b) automated content presentation segments based on user stored interactive links.

19. The method of claim 16, further comprising:
providing a user with access to real-time link advertisements in an information window while multimedia content is being presented, wherein the user specifies object type information to determine what types of object are included within real-time link advertisements, wherein the user is able to purchase particular items via the information window.

\* \* \* \* \*